(12) United States Patent
Homma et al.

(10) Patent No.: US 8,619,046 B2
(45) Date of Patent: Dec. 31, 2013

(54) INFORMATION PROCESSING APPARATUS, NOTIFICATION METHOD, AND PROGRAM

(75) Inventors: Fuminori Homma, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 522 days.

(21) Appl. No.: 12/726,432

(22) Filed: Mar. 18, 2010

(65) Prior Publication Data

US 2010/0253652 A1    Oct. 7, 2010

(30) Foreign Application Priority Data

Apr. 3, 2009    (JP) ................... 2009-091306

(51) Int. Cl.
*G06F 3/041*    (2006.01)
(52) U.S. Cl.
USPC ........................................ 345/173; 178/18.04
(58) Field of Classification Search
USPC .............................. 345/156–184; 341/22–34; 340/407.1–407.2; 708/142–146; 178/18.01–19.07
See application file for complete search history.

(56) References Cited

U.S. PATENT DOCUMENTS

| 2008/0150902 A1* | 6/2008 | Edpalm et al. | 345/173 |
| 2009/0073128 A1* | 3/2009 | Marsden | 345/168 |
| 2010/0156793 A1* | 6/2010 | Ozias et al. | 345/168 |

FOREIGN PATENT DOCUMENTS

JP    2004-54589    2/2004

* cited by examiner

*Primary Examiner* — Liliana Cerullo
(74) *Attorney, Agent, or Firm* — Sherr & Jiang, PLLC

(57) ABSTRACT

An information processing apparatus is disclosed which includes: an operation display device displaying a plurality of virtual operation keys on a display screen in a predetermined key layout so as to detect operations performed by a user on the display screen; a vibration detection device detecting vibration changes of the operation display device; a key operation determination device determining whether a key input operation is performed on each of the virtual operation keys based on results of the detection by the operation display device and on results of the detection by the vibration detection device; and a notification control device giving notification selectively to the user based on those results of the determination by the key operation determination device.

8 Claims, 11 Drawing Sheets

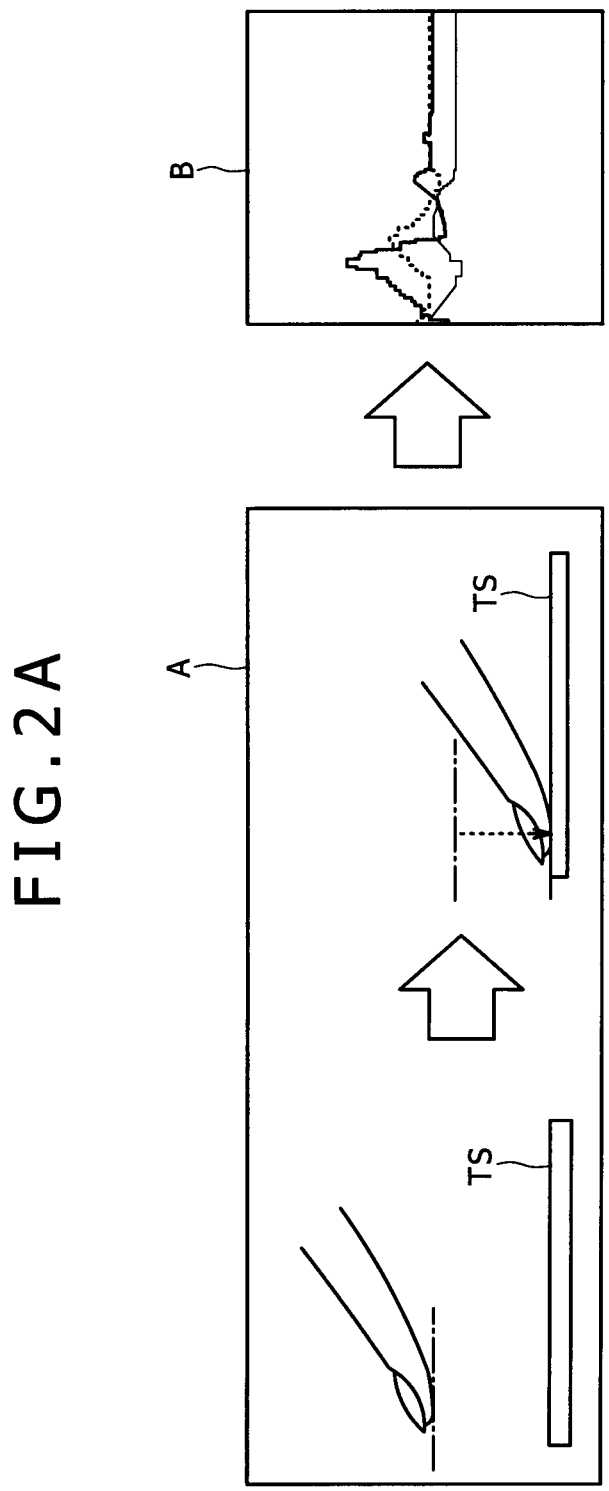

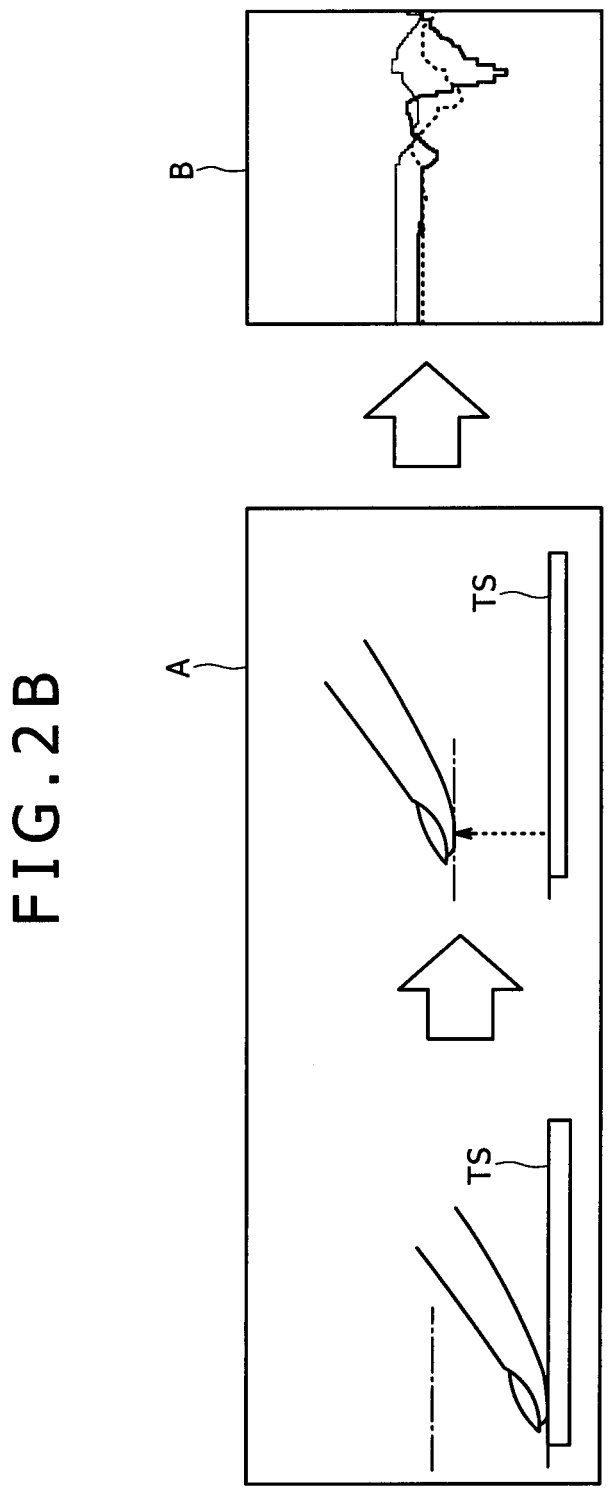

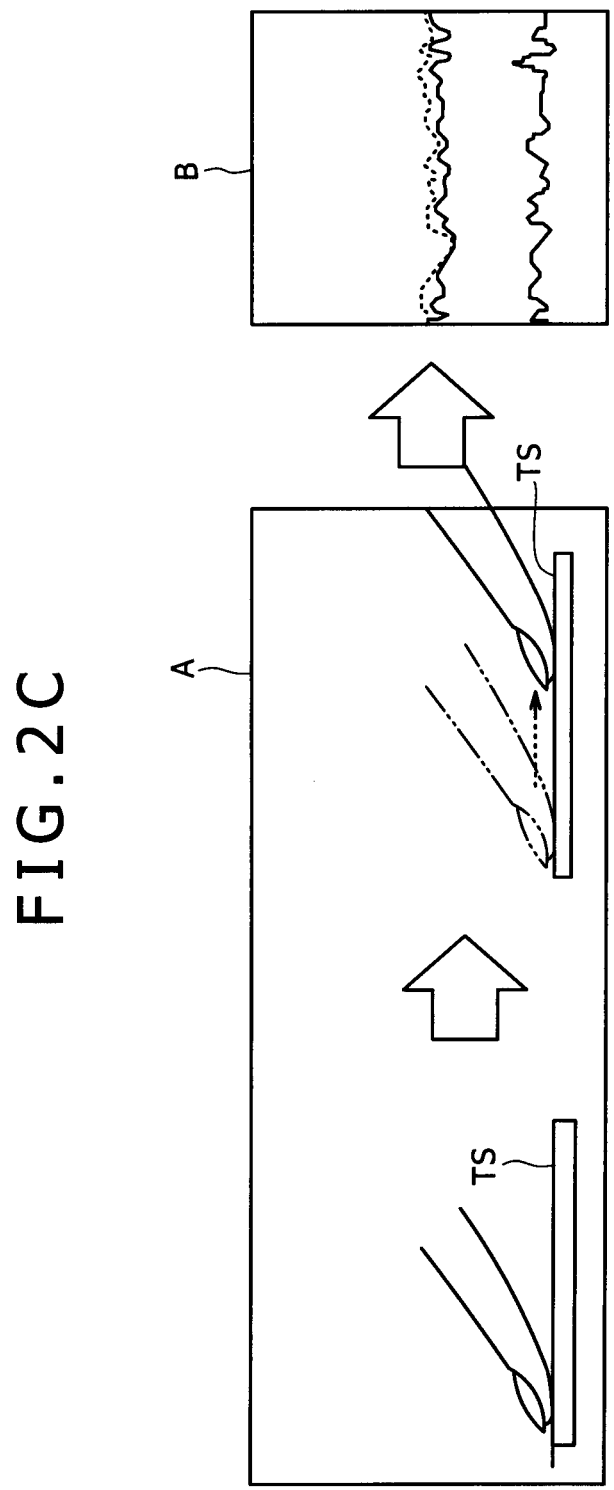

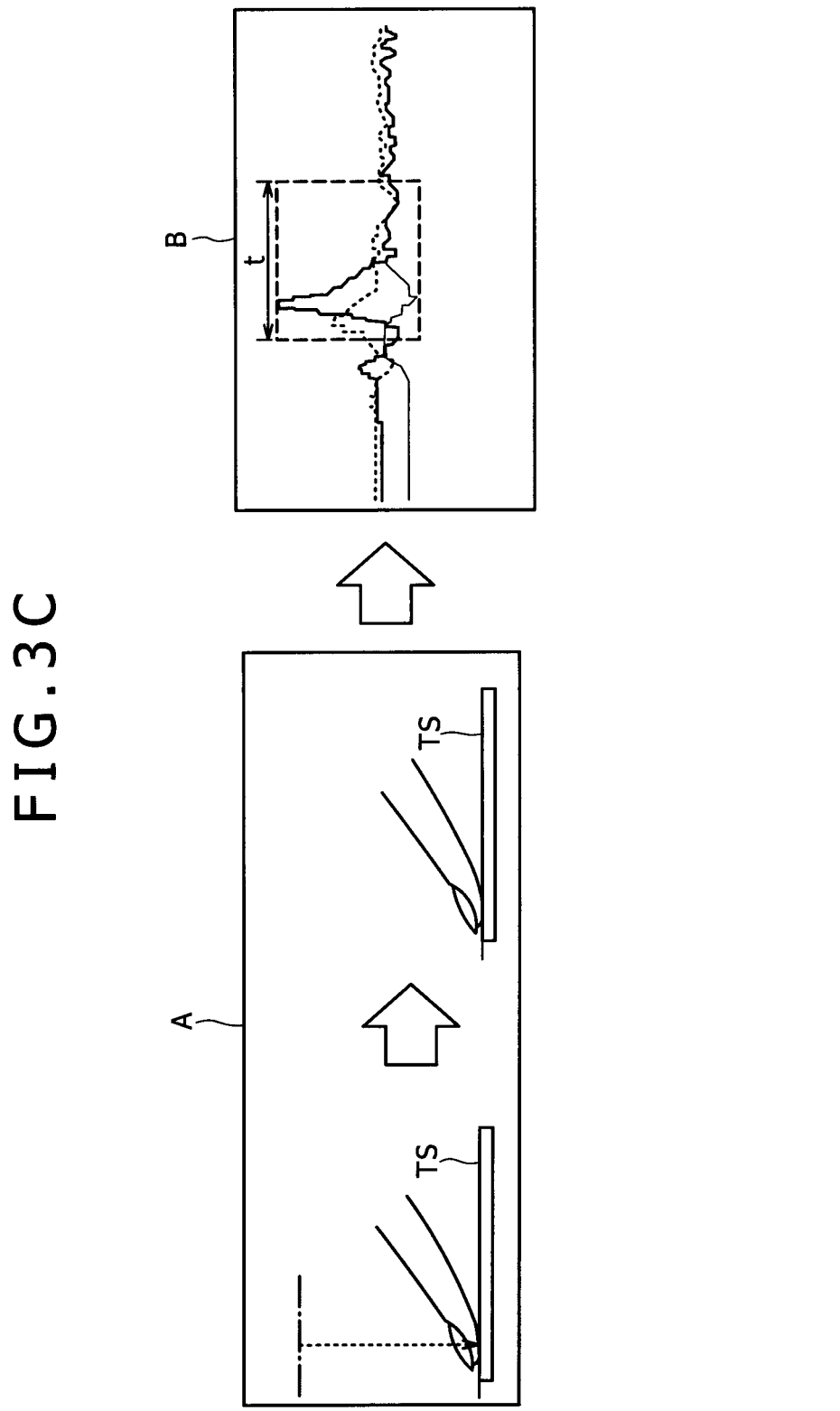

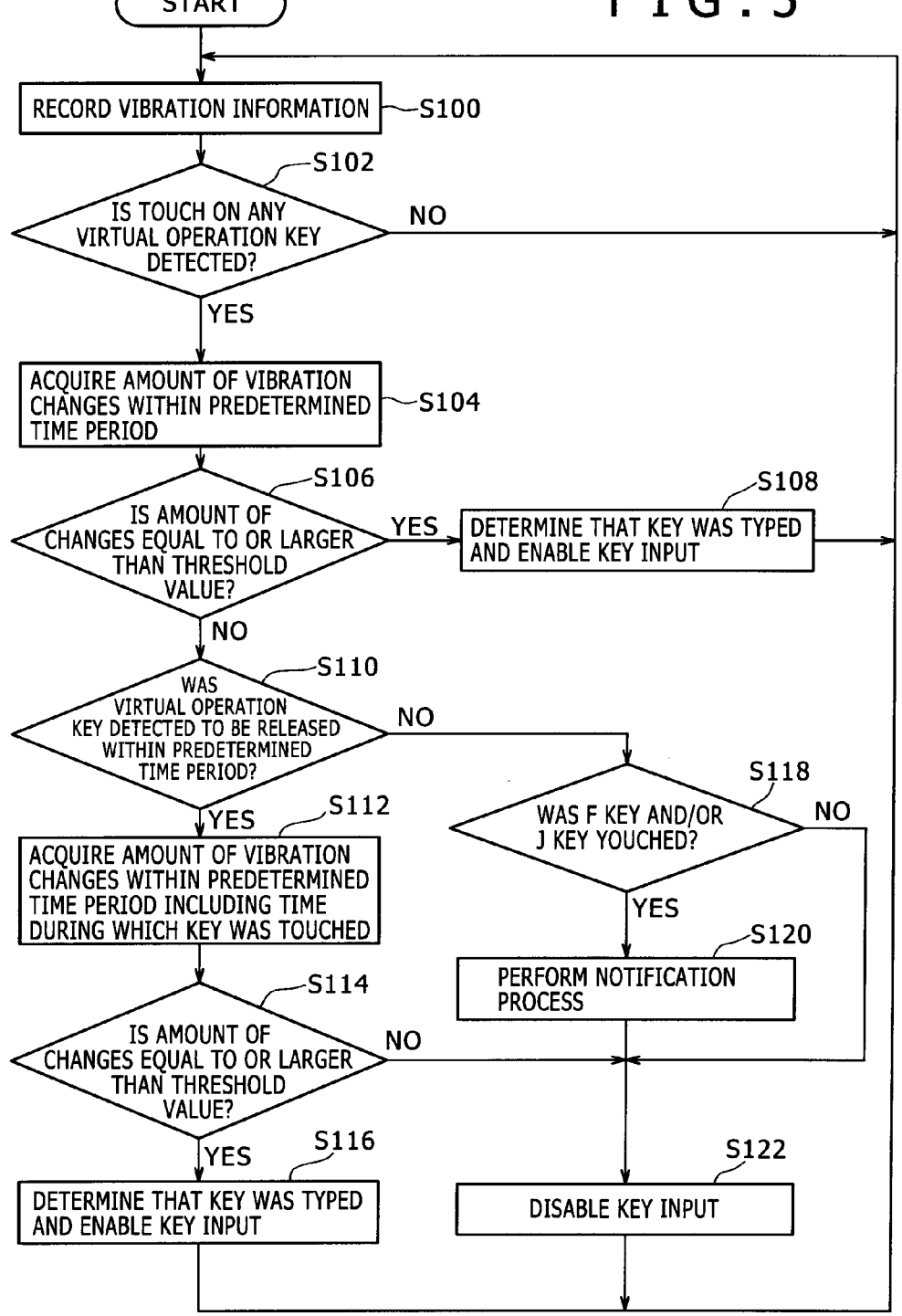

INFORMATION PROCESSING APPARATUS, NOTIFICATION METHOD, AND PROGRAM

BACKGROUND OF THE INVENTION

1. Field of the Invention

The present invention relates to an information processing apparatus, a notification method, and a program.

2. Description of the Related Art

Recent years have witnessed the appearance of electronic apparatus furnished with a so-called on-screen keyboard (called the OSK hereunder) formed by icons and virtual operation keys displayed on a display screen to be touched by a user for input purposes. The OSK is constituted illustratively by a touch display screen that displays a plurality of virtual operation keys laid out in a manner similar to the hardware keyboard, i.e., a physical input interface designed to input characters. As such, the OSK is a kind of virtual input interface. The OSK was developed as an input interface to keep pace with the ongoing miniaturization of electronic devices such as PCs (personal computers), changes in the form of such devices and in the environment in which they are used, and growing emphasis on their design and functionality. The OSK is now attracting attention as an effective input interface.

Under these circumstances, efforts are underway to develop techniques intended to enhance the user's convenience in handling the virtual input interface. One such technique, disclosed illustratively in Japanese Patent Laid-Open No. 2004-54589, involves allowing the virtual operation keys defining the position of reference for key input operations (i.e., so-called home position) to be established as desired based on the user's operations.

SUMMARY OF THE INVENTION

On the hardware keyboard acting as a physical input interface, the F and J keys are arranged to bear bumps defining the keys as constituting the position of reference (home position) for key input operations. A tactile sensation of the bumps on the specific keys of the hardware keyboard enables the user to verify by touch the home position of the keyboard so that the user can perform key input operations without visually verifying the keyboard (whereby touch typing is achieved). The arrangement above thus allows the user utilizing the hardware keyboard to touch-type at high speed.

The usual technique for improving the user's ease (simply called the old technique) in handling the virtual input interface relies on changes in the pressure exerted onto the touch panel by the user's operations for dynamically altering the locations of the virtual operation keys defining the home position. However, the old technique can only make it possible visually to display the virtual operation keys corresponding to the F and J keys defining the home position (the keys may be called the reference virtual operation keys hereunder where appropriate). That is, when handling the information processing apparatus adopting the old technique (called the old information processing apparatus hereunder where appropriate), the user grasps the virtual home position only through visual verification thereof.

In utilizing the old information processing apparatus, the user needs to visually ascertain the reference virtual operation keys to align his or her fingertips with the key locations in order to proceed with touch typing. Once the user's fingertips are detached from the virtual input interface of the old information processing apparatus, the user must visually ascertain the reference virtual operation keys and align his or her fingertips with the key locations before proceeding with touch typing.

As a result, the old information processing apparatus has failed to enhance the user's ease in handling the virtual input interface such as the OSK displayed on the touch display screen.

The present invention has been made in view of the above circumstances and provides an information processing apparatus, a notification method, and a program for improving the user's convenience in handling the virtual input interface displayed on a display screen.

In carrying out the present invention and according to one embodiment thereof, there is provided an information processing apparatus including: an operation display device configured to display a plurality of virtual operation keys on a display screen in a predetermined key layout so as to detect operations performed by a user on the display screen; a vibration detection device configured to detect vibration changes of the operation display device; a key operation determination device configured to determine whether a key input operation is performed on each of the virtual operation keys based on results of the detection by the operation display device and on results of the detection by the vibration detection device; and a notification control device configured to give notification selectively to the user based on those results of the determination by the key operation determination device which indicate that no key input operation is being performed on any of the virtual operation keys and that the virtual operation keys corresponding to the results of the detection by the operation display device constitute reference virtual operation keys defining the position of reference.

The above-outlined structure of the inventive information processing apparatus enhances the user's convenience in handling a virtual input interface displayed on the display screen.

Preferably, the key operation determination device may determine the key input operation on each of the virtual operation keys based on the amount of vibration changes detected during a predetermined time period having elapsed since the detection of the operations performed by the user.

Preferably, when the amount of vibration changes is found to be equal to or larger than a predetermined threshold value, or found to exceed a predetermined threshold value, the key operation determination device may determine that key input operations have been performed on the virtual operation keys corresponding to the results of the detection by the operation display device.

Preferably, if no key input operation is determined to have been performed on the virtual operation keys corresponding to the results of the detection by the operation display device and if no other operation is detected to have been performed by the user since the detection of the operations performed by the user, then the key operation determination device may determine whether the virtual operation keys corresponding to the results of the detection by the operation display device are the reference virtual operation keys.

Preferably, the information processing apparatus according to the embodiment of the present invention may further include a key input control device configured to selectively enable or disable key input through the virtual operation keys corresponding to the results of the detection by the operation display device based on results of the determination by the key operation device.

Preferably, the key input control device may disable the key input based on those results of the determination by the key operation determination device which indicate that no key input operation is being performed on any one of the virtual operation keys.

Preferably, the information processing apparatus according to the embodiment of the present invention may further include a notification device configured to give notification selectively to the user under control of the notification control device.

According to another embodiment of the present invention, there is provided a notification method including the steps of: determining whether a key input operation is performed on each of a plurality of virtual operation keys displayed on a display screen in a predetermined key layout, based on results of an operation display device detecting operations performed by a user on the display screen, and on results of a vibration detection device detecting vibration changes of the operation display device; and giving notification selectively to the user based on results of the determination indicating that no key input operation is being performed on any of the virtual operation keys and that the virtual operation keys corresponding to the results of the detection by the operation display device constitute reference virtual operation keys defining the position of reference.

The above-outlined notification method of the present invention also enhances the user's convenience in handling the virtual input interface displayed on the display screen.

According to a third embodiment of the present invention, there is provided a program for causing a computer to execute a process including the steps of: determining whether a key input operation is performed on each of a plurality of virtual operation keys displayed on a display screen in a predetermined key layout, based on results of an operation display device detecting operations performed by a user on the display screen, and on results of a vibration detection device detecting vibration changes of the operation display device; and giving notification selectively to the user based on results of the determination indicating that no key input operation is being performed on any of the virtual operation keys and that the virtual operation keys corresponding to the results of the detection by the operation display device constitute reference virtual operation keys defining the position of reference.

The above-outlined program of the present invention also enhances the user's convenience in handling the virtual input interface displayed on the display screen.

As outlined above, the information processing apparatus, notification method, or program according to the embodiment of the present invention improves the user's convenience in handling the virtual input interface displayed on the display screen.

BRIEF DESCRIPTION OF THE DRAWINGS

Further advantages of the present invention will become apparent upon a reading of the following description and appended drawings in which:

FIG. 2A is a schematic view explanatory of typical results of the detection performed by a vibration detection device as part of the information processing apparatus embodying the present invention;

FIG. 2B is a schematic view explanatory of other typical results of the detection performed by the vibration detection device as part of the information processing apparatus embodying the present invention;

FIG. 2C is a schematic view explanatory of other typical results of the detection performed by the vibration detection device as part of the information processing apparatus embodying the present invention;

FIG. 3C is a schematic view explanatory of other typical results of the key input operation determination process performed by the information processing apparatus embodying the present invention;

FIG. 5 is a flowchart explanatory of a typical process carried out by the information processing apparatus embodying the present invention;

DETAILED DESCRIPTION OF THE PREFERRED EMBODIMENTS

Figure 1:
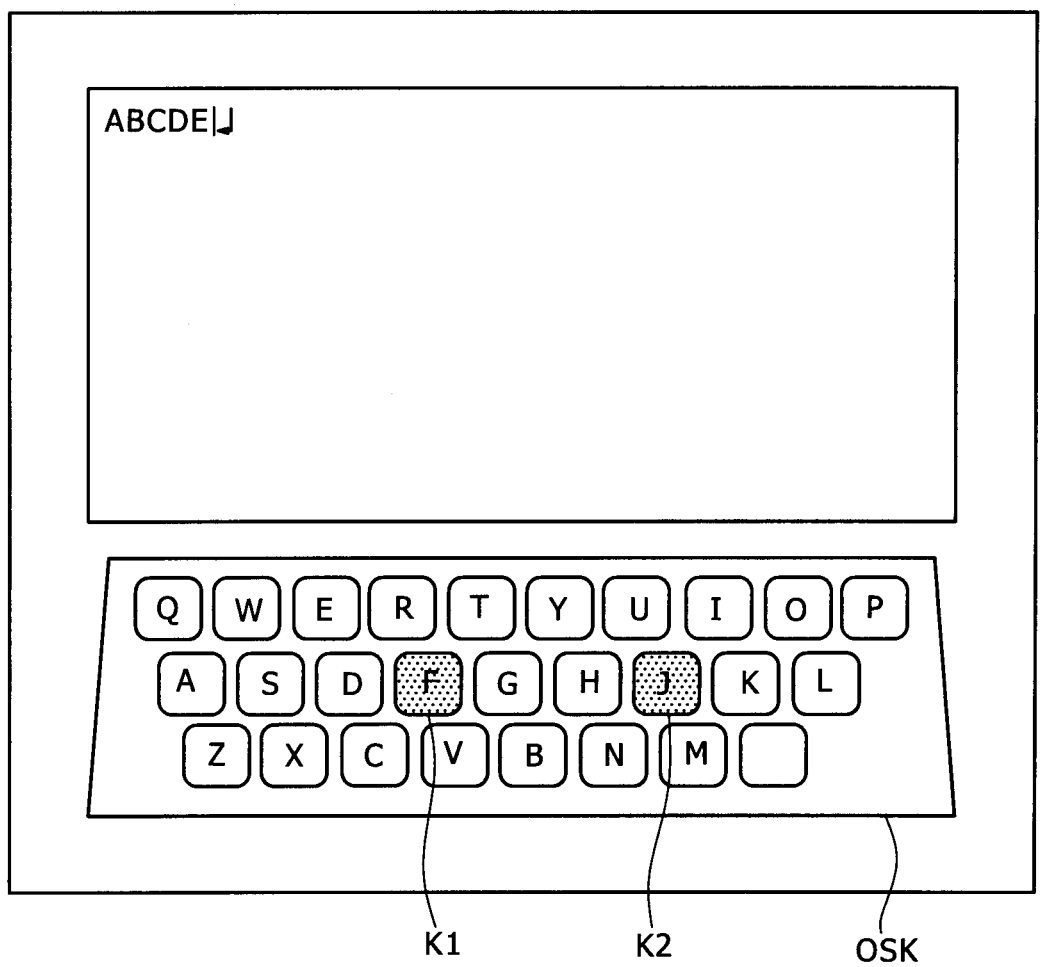
FIG. 1 is a schematic view explanatory of a typical virtual input interface displayed on a display screen of an information processing apparatus practiced as one embodiment of the present invention.

Some preferred embodiments of the present invention will now be described below in detail by referring to the accompanying drawings. Throughout the drawings and ensuing description, like or corresponding parts in functional and structural terms will be designated by like reference numerals, and their explanations will be omitted where redundant.

The description that follows will be given under the following headings:
1. Approach to implementing embodiments of the present invention
2. Information processing apparatus embodying the present invention
3. Program embodying the present invention
(Approach to Implementing Embodiments of the Present Invention)

Before a description is made of an information processing apparatus embodying the present invention (called the information processing apparatus 100 hereunder), there will be explained an approach to how the invention may be embodied in a manner enhancing the user's convenience in handling a virtual input interface displayed on the display screen of the inventive apparatus.
[Typical Virtual Input Interface of the Embodiment]

FIG. 1 is a schematic view explanatory of a typical virtual input interface displayed on the display screen of the information processing apparatus 100 implemented as one embodiment of the present invention. Specifically, what is shown in FIG. 1 is an image appearing on a touch display screen (an example of the operation display device to be discussed later) as part of the information processing apparatus 100. In the ensuing paragraphs, there will be explained an electrostatic touch screen which constitutes a typical operation display device of the information processing apparatus 100 embodying the present invention and which is capable of detecting operations performed by the user on the display screen. Obviously, the operation display device of the information processing apparatus 100 may alternatively be constituted by a pressure-sensitive touch screen.

As shown in FIG. 1, the display screen displays (i.e., allocates) an on-screen keyboard (OSK) as a virtual keyboard that works as a virtual input interface. Also as indicated in FIG. 1, a plurality of virtual operation keys (e.g., A key, S key, etc.) are displayed on the display screen in a predetermined key layout. The virtual operation keys displayed on the display screen of the information processing apparatus 100 are used illustratively to input characters. However, the virtual operation keys are not limited to character input alone. These keys may be utilized alternatively as triggers that cause the information processing apparatus 100 to perform certain processes.

In FIG. 1, the F key (indicated K1) and the J key (indicated by K2) constituting the reference virtual operation keys defining the position of reference are shown in a visually different manner from the other virtual operation keys. When the F and J keys serving to define the so-called home position are displayed in visually different fashion from the other virtual operation keys as shown in FIG. 1, the user is able to visually recognize the virtual home-position keys.

By performing key input operations on the OSK of the display screen in the same manner as on the hardware keyboard, the user of the information processing apparatus 100 can input desired characters into the apparatus 100 (i.e., cause the apparatus 100 to recognize the characters). Incidentally, the key input operations mentioned in connection with the embodiment of the present invention refer to the operations carried out by the user to input desired characters (or to execute desired processes) represented by the virtual operation keys that are operated on. A key input operation typically involves the user pressing down intentionally on a particular virtual operation key.

The virtual input interface of the embodiment of the present invention is not limited to the OSK shown in FIG. 1. Alternatively, the virtual input interface of the embodiment may include additional virtual operation keys such as an Enter key and Shift keys. As another alternative, the virtual input interface of the embodiment may include virtual operation keys each constituted by an image such as an icon. In the ensuing description, the input interface using a touch screen such as the OSK displayed on the screen shown in FIG. 1 may be referred to as the virtual input interface.

[Typical Problem with the Virtual Input Interface]

When the virtual input interface such as the OSK in FIG. 1 is displayed on the touch screen, the touch screen is ready to detect operations performed by the user on the display screen. However, when the virtual input interface is implemented using a touch screen, a problem rarely experienced with the hardware keyboard can occur. Specifically, whereas the hardware keyboard is capable of distinguishing between a "touch" and a "press" on its operation keys, the virtual input interface is incapable of making such a distinction. That is, even though the user simply touches virtual operation keys with no intention of performing key input operations, the virtual input interface may erroneously recognize such operations being carried out on the touched keys. This problem arises from the fact that the touch screen constituting the virtual input interface can only distinguish between "touched" and "untouched" keys. Incidentally, both the state of the touch screen being simply in contact with fingertips and the state of the touch screen being operated on by the user may be called a "touched" state each in the ensuing description.

It follows that even when the user simply places his or her fingertips on the so-called home position of the virtual input interface utilizing the touch screen, the information processing apparatus can mistakenly recognize key input operations being performed on the virtual input interface. In such a case, the user needs to correct the erroneously input characters. Furthermore, for fear of causing the false character recognition, the user cannot keep the fingertips placed on the home position. That is, where the information processing apparatus adopting the virtual input interface is liable to incur such erroneous recognition, the user is unable to perform touch typing.

Thus the information processing apparatus providing the user with the virtual input interface using the touch screen should be capable of distinguishing between two states: a state in which the user merely touches virtual operation keys, and a state in which the user is performing key input operations. Unless that distinction can be made, it is difficult to enhance the user's convenience in handling the virtual input interface.

[Outline of the Approach to Improving the Ease of Use of the Embodiment]

As described above, the information processing apparatus offering the user the touch screen-based virtual input interface is incapable of improving the user's ease of operation unless it distinguishes the virtual operation keys being "touched" by the user from those being "operated on."

Where the old technique is utilized as discussed earlier, the user must visually ascertain the reference virtual operation keys in order to align his or her fingertips with the locations of these keys. Without visual verification, it is difficult for the user even to ascertain whether his or her fingertips are being placed on the reference virtual operation keys. That is, the old technique makes it difficult for the user to proceed with touch typing; improvements in the user's ease of operation cannot be hoped for by having recourse to the old technique.

Illustratively, the information processing apparatus 100 embodying the present invention performs two kinds of processes (1) and (2), to be discussed below, so as to enhance the user's convenience in handling the virtual input interface displayed on the display screen as shown in FIG. 1.

(1) Key Input Operation Determination Process

As described above, the touch screen (i.e., an example of the operation display device to be discussed later) constituting the virtual input interface can only distinguish between touched and untouched keys. In order to bypass this bottleneck, the information processing apparatus 100 has a vibration detection device such as a gyro sensor or an acceleration sensor (an example of the vibration detection device to be discussed later) for detecting vibrations of the touch screen. The information processing apparatus 100 determines whether a key input operation is performed on each of the virtual operation keys based on the result of the detection performed by the touch screen and on the result of the detection by the vibration detection device.

FIGS. 2A through 2C are schematic views explanatory of typical results of the detection performed by the vibration detection device as part of the information processing apparatus 100 embodying the present invention. In FIG. 2A through 2C, reference character A indicates typical operations performed by the user, and reference character B denotes typical results of the detection performed by a triaxial gyro sensor acting as the vibration detection device. FIG. 2A shows the case in which the user touches a touch screen TS, and FIG. 2B indicates the case in which the user removes his or her fingertip from the touch screen TS. In the ensuing description, the user's operation of removing his or her fingertip from the touch screen may be referred as a "release." FIG. 2C depicts the case where the user slides his or her fingertip on the touch screen TS.

When furnished with the vibration detection device, the information processing apparatus 100 may acquire vibration information representative of the amount of vibrations reflecting the user's operation as a result of the detection performed by that device. The results of the detection by the vibration detection device are arranged to be recorded by the information processing apparatus 100 to an internal storage device (to be discussed later) as the vibration information. However, this arrangement is not limitative of the present invention. Alternatively, the information processing apparatus 100 may record the vibration information to a removable external recording medium such as a Memory Stick or an SD card or to an external device that may be accessed for communication either directly or via a network.

What follows is a more specific explanation of the process (1). The information processing apparatus 100 determines whether any of the virtual operation keys is touched based on the results of the detection performed by the touch screen. The determination by the information processing apparatus 100 of whether any key is touched corresponds to the determination of whether any operation is performed by the user.

If it is determined that any one of the virtual operation keys is touched, the information processing apparatus 100 finds the amount of vibration changes over a predetermined time period since the detection of the touch. Based on the amount of vibration changes thus obtained, the information processing apparatus 100 determines whether a key input operation is performed on any one of the virtual operation keys. In this case, the information processing apparatus 100 may illustratively acquire the amount of vibration changes using the vibration information stored in the storage device (to be discussed later). If the obtained amount of vibration changes is found to be equal to or larger than a predetermined threshold value, or found to exceed a predetermined threshold value, the information processing apparatus 100 may determine that a key input operation has been performed on a given virtual operation key corresponding to the result of the detection performed by the touch screen. The threshold value information may be typically stored in the storage device (to be discussed later) or somewhere else. However, this arrangement is not limitative of the present invention. The threshold value may be a fixed value determined in advance or may be set as desired by the user's operations.

On the other hand, if no key input operation is determined to be performed on any virtual operation key corresponding to the result of the detection by the touch screen, then the information processing apparatus 100 determines that the user has simply "touched" the virtual operation key in question.

[Examples of the Key Input Operation Determination Process]

Figure 3A:
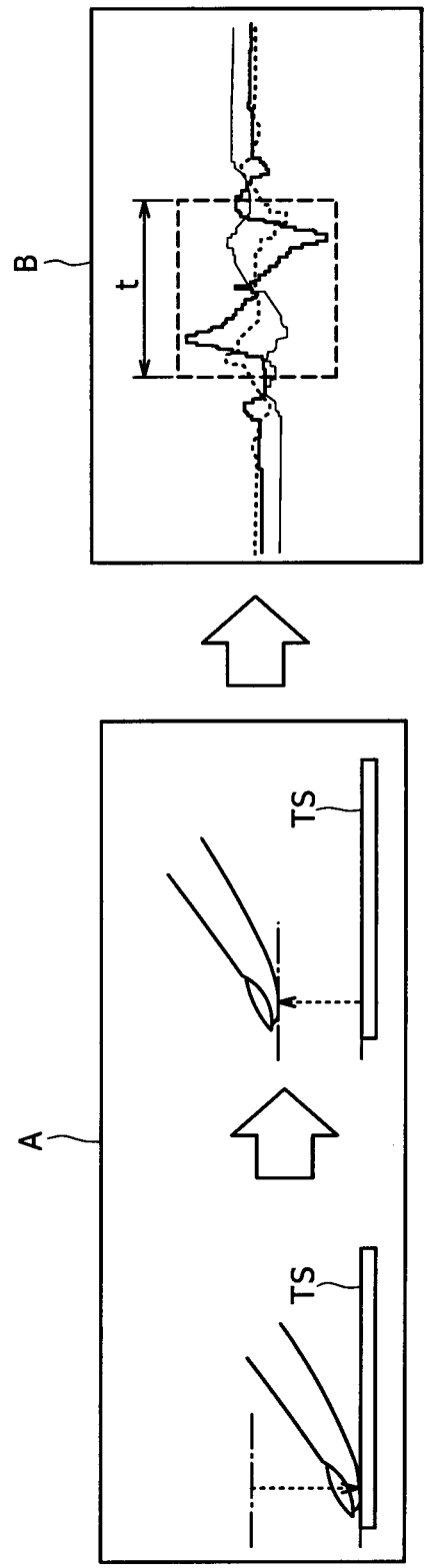
FIG. 3A is a schematic view explanatory of typical results of a key input operation determination process performed by the information processing apparatus embodying the present invention.
Figure 3B:
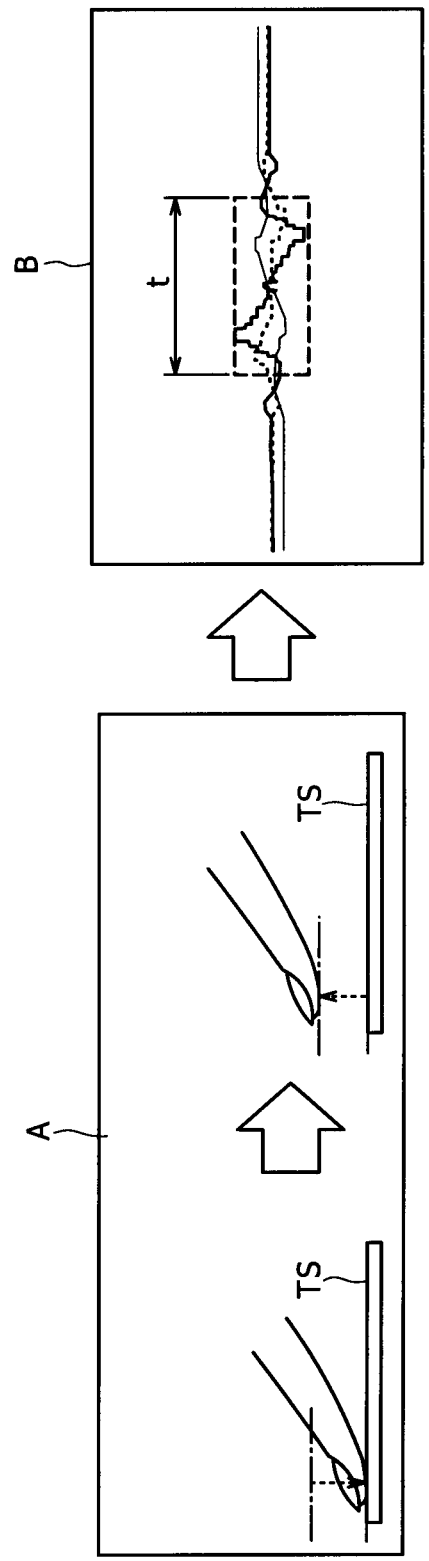
FIG. 3B is a schematic view explanatory of other typical results of the key input operation determination process performed by the information processing apparatus embodying the present invention.

FIGS. 3A through 3C are schematic views explanatory of the key input operation determination process performed by the information processing apparatus 100 embodying the present invention. As in FIGS. 2A through 2C, reference characters A and B in FIG. 3A through 3C denote respectively typical operations performed by the user and typical results of the detection corresponding to the user's operations. It should be noted that the operations and their results shown in FIG. 3A through 3C are only examples and not limitative of the present invention.

[A] First Example (FIG. 3A)

When the user touches the touch screen TS and then releases his or her fingertip from the touch screen TS as indicated by reference character A in FIG. 3A, the operation triggers the detection of which the result is indicated by reference character B in FIG. 3A. The information processing apparatus 100 determines whether a key input operation is performed based on the total sum of changes over a predetermined time period "t" (e.g., total sum of changes in absolute values) and on a predetermined threshold value.

[B] Second Example (FIG. 3B)

When the user releases his or her fingertip from the touch screen TS as indicated by reference character A in FIG. 3B, the operation triggers the detection of which the result is indicated by reference character B in FIG. 3B. As in the case of FIG. 3A, the information processing apparatus 100 determines whether a key input operation is performed based on the total sum of changes over the predetermined time period "t" and on the predetermined threshold value.

[C] Third Example (FIG. 3C)

When the user touches the touch screen TS as indicated by reference character A in FIG. 3C, the operation triggers the detection of which the result varies with the intensity of the touch as indicated by reference character B in FIG. 3C. As in the case of FIG. 3A, the information processing apparatus 100 determines whether a key input operation is performed based on the total sum of changes over the predetermined time period "t" and on the predetermined threshold value.

The information processing apparatus 100 determines whether a key input operation is performed illustratively by acquiring the amount of changes based on the results of the detection performed by the vibration detection device as indicated by reference character B in FIGS. 3A through 3C. Regarding the first through the third examples shown in FIGS. 3A through 3C respectively, the information processing apparatus 100 determines that a key input operation has been performed in the first example (FIG. 3A) as well as in the third example (FIG. 3C), but finds that no key input operation is performed in the second example (FIG. 3B). These cases are merely examples and not limitative of the present invention.

The information processing apparatus 100 determines whether a key input operation is performed on each of the virtual operation keys illustratively on the basis of the result of the detection performed by the touch screen and of the result of the detection by the vibration detection device. In carrying out the process (1) as described above, the information processing apparatus 100 can distinguish the user "touching" any virtual operation key from the user "pressing" any virtual operation key as if the user were using a hardware keyboard.

Also the information processing apparatus 100 selectively enables or disables key input through the virtual operation keys based on the result of the process (1) (i.e., result of the determination). More specifically, the information processing apparatus 100 selectively enables key input when determining that a key operation is performed and selectively disables key input upon determination that no key input operation is carried out.

By selectively disabling key input, the information processing apparatus 100 can stop recognizing mistakenly that a key operation has been performed when in fact the user has simply put his or her fingertips on the so-called home position of the touch screen.

(2) Notification Process

Through the process (1) above, the information processing apparatus 100 can distinguish between the user "touching" any virtual operation key and the user "pressing" any virtual operation key. If the user ascertained whether his or her fingertips are on the location of the reference virtual operation keys solely by visually verifying these keys as in the case of the old technique being adopted, the user would be unable to proceed with touch typing and could not expect to gain an enhanced ease of operation.

Instead, the information processing apparatus 100 gives notification to the user selectively if the user is found to have "touched" a virtual operation key in the process (1) above and if the key involved is a reference virtual operation key (F key/J key). The notification given selectively to the user by the information processing apparatus 100 serves as a feedback telling the user that his or her fingertips are placed on the locations of the reference virtual operation keys, much like the bumps of the F and J keys on the hardware keyboard.

For example, the information processing apparatus 100 gives notification selectively to the user if execution of the process (1) above reveals two things: that no key input operation is detected, and that the virtual operation key corresponding to the result of the detection by the touch screen is a reference virtual operation key.

The notification may be brought about by the information processing apparatus 100 illustratively in the form of vibration (i.e., tactile notification), sound (auditory notification), or LED (light emitting diode) illumination (visual notification). However, these forms of notification are merely examples and not limitative of the present invention. Alternatively, the information processing apparatus 100 may combine such notification devices suitably to give notification to the user. As another alternative, the information processing apparatus 100 may change the way the reference virtual operation keys are displayed between the case in which key input is enabled (i.e., where a key is determined to be "pressed") and the case in which key input is disabled (i.e., a key is determined to be "touched").

Figure 4A:
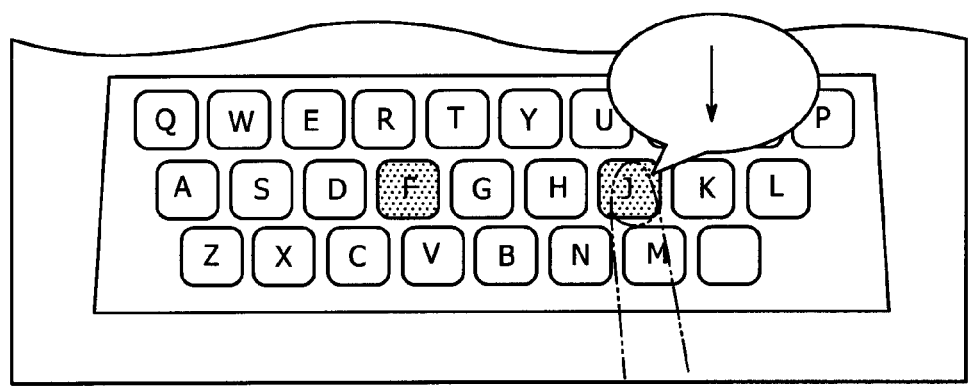
FIG. 4A is a schematic view explanatory of a typical notification device as part of the information processing apparatus embodying the present invention.
Figure 4B:
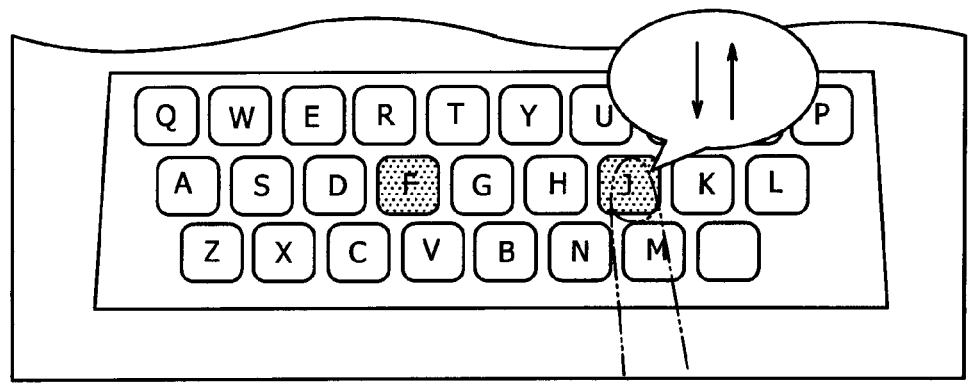
FIG. 4B is a schematic view explanatory of another typical notification device as part of the information processing apparatus embodying the present invention.

FIGS. 4A and 4B are schematic views explanatory of another typical notification device as part of the information processing apparatus 100 embodying the present invention. FIG. 4A shows a typical display given when the information processing apparatus 100 has determined that the J key is "touched," while FIG. 4B indicates a typical display in effect when the information processing apparatus 100 has determined that the J key is "pressed."

When the information processing apparatus 100 varies the way the reference virtual operation keys are displayed depending on the result of the detection as shown in FIGS. 4A and 4B, the user can visually recognize one of the two states determined: a "touched" state and a "pressed" state. Although FIGS. 4A and 4B show display examples regarding solely the J key (a reference virtual operation key), the information processing apparatus 100 can obviously give similar displays associated with the other reference virtual operation keys as well.

When the information processing apparatus 100 gives notification to the user selectively based on the result of the process (1) above, the user finds out that his or her fingertips are placed on the reference virtual operation keys. That is, the user of the information processing apparatus 100, unlike the user of an apparatus utilizing the old technique, can find out whether the fingertips are placed on the home position without verifying visually the reference virtual operation keys. Thus the information processing apparatus 100 allows the user to execute touch typing more easily than information processing apparatuses employing the old technique.

By carrying out the process (1) above (i.e., key input operation determination process) and process (2) (i.e., notification process), the information processing apparatus 100 improves the user's convenience in handling the virtual input interface displayed on the display screen of the apparatus.

[Typical Process as an Approach to Implementing the Embodiments of the Present Invention]

What follows is a detailed explanation of a process as an approach to improving the ease of operation by means of the information processing apparatus 100 embodying the present invention. FIG. 5 is a flowchart explanatory of a typical process carried out by the information processing apparatus 100.

In step S100 of FIG. 5, the information processing apparatus 100 records vibration information. Illustratively, the information processing apparatus 100 records to the storage device (to be discussed later) the vibration information derived from the result of the detection performed by the vibration detection device (to be described later).

After the vibration information is recorded in step S100, the information processing apparatus 100 goes to step S102. In step S102, the information processing apparatus 100 checks to determine whether a touch on any virtual operation key is detected. Illustratively, the information processing apparatus 100 may carry out step S102 based on the result of the detection by the touch screen (an example of the operation display device to be discussed later). The way step S102 is carried out as described is merely an example and not limitative of the present invention.

If in step S102 no virtual operation key is detected to be touched, the information processing apparatus 100 returns to step S100 and repeats the process from there.

If in step S102 any virtual operation key is detected to be touched, the information processing apparatus 100 goes to step S104. In step S104, the information processing apparatus 100 acquires the amount of vibration changes over a predetermined time period. The value representative of a fixed time period for use as a criterion in step S104 may be determined in advance. However, this is not limitative of the present invention. Alternatively, the value representative of the fixed time period may be set as desired by the user's operations.

After acquiring the amount of vibration changes over the predetermined time period in step S104, the information processing apparatus 100 goes to step S106. In step S106, the information processing apparatus 100 checks to determine whether the amount of vibration changes is equal to or larger than a threshold value. The condition for making the determination in step S106 is not limited to the one discussed here. Alternatively, the information processing apparatus 100 in step S106 may check to determine whether the amount of vibration changes is otherwise in excess of the threshold value.

If in step S106 the amount of vibration changes is determined to be equal to or larger than the threshold value, the information processing apparatus 100 determines that the user has typed (i.e., performed a key input operation). In this case, the information processing apparatus 100 goes to step S108 and enables key input. The key input enabled in connection with the embodiment of the present invention signifies that the information processing apparatus 100 recognizes the input (or execution) of the character (or process) denoted by the virtual operation key corresponding to the key input operation.

When key input is enabled by execution of step S108, the display screen of the information processing apparatus 100 displays illustratively the character corresponding to the key input operation. The information processing apparatus 100 then returns to step S100 and repeats the subsequent steps.

If in step S106 the amount of variation changes is detected to be smaller than the threshold value, then the information processing apparatus 100 goes to step S110. In step S110, the information processing apparatus 100 checks to determine whether the virtual operation key is released within a predetermined time period.

The information processing apparatus 100 carries out step S110 on the basis of the changes in the result of the detection by the touch screen. However, the way step S100 is executed is not limited to what was described above. Alternatively, the information processing apparatus 100 may store beforehand pattern information indicative of patterns of the result of the detection by the vibration detection device upon determination of a release operation such as one shown in FIG. 2B. The information processing apparatus 100 may then carry out step S110 by checking the pattern information against the result of the detection by the vibration detection device. The information processing apparatus 100 may illustratively store the pattern information in a ROM (read only memory) or in the storage device (to be discussed later) or may store the information somewhere else. The way step S110 is carried out is not limited to what was described above.

The value representative of the fixed time period for use as a criterion in step S110 may be determined in advance. However, this is not limitative of the present invention. Alternatively, the value representative of the fixed time period may be set as desired by the user's operations.

[When a Virtual Operation Key is Detected to be Released within a Predetermined Time Period]

If in step S110 the virtual operation key is detected to be released within the predetermined time period, the information processing apparatus 100 goes to step S112. In step S112, the information processing apparatus 100 acquires the amount of vibration changes within the fixed time period including the period during which the key was being touched. Performing step S112 involves obtaining the amount of vibration changes over a time period longer than the predetermined period in step S104. The information processing apparatus 100 may establish the time period ranging from the touch of a key to its release, supplemented with a predetermined value, as the value representative of the fixed time period in step S112. However, this value is merely an example and not limitative of the present invention.

After obtaining the amount of vibration changes in step S112, the information processing apparatus 100 goes to step S114. In step S114, as in step S106, the information processing apparatus 100 checks to determine whether the amount of variation changes is equal to or larger than the threshold value. The condition for making the determination in step S114 is not limited to the one discussed here.

Upon determination that the amount of variation changes is equal to or larger than the threshold value in step S114, the information processing apparatus 100 goes to step S116. In step S116, as in step S108, the information processing apparatus 100 determines that the user has typed (i.e., performed a key input operation) and enables key input. The information processing apparatus 100 then returns to step S100 and repeats the subsequent steps.

Upon determining that the amount of variation changes is smaller than the threshold value in step S114, the information processing apparatus 100 goes to step S122. In step S122, the information processing apparatus 100 determines that no key input operation is performed by the user and thus disables key input. Following the execution of step S122, the display screen of the information processing apparatus 100 does not display the character corresponding to the virtual operation key being touched by the user on the touch screen. The information processing apparatus 100 then returns to step S100 and repeats the subsequent steps.

When selectively disabling key input based on the result of the determination in step S114, the information processing apparatus 100 can distinguish the user "touching" any virtual operation key from the user "pressing" any virtual operation key, as in the case of the hardware keyboard.

[When the Virtual Operation Key is not Detected to be Released within the Predetermined Time Period]

If in step S110 the virtual operation key is not detected to be released within the predetermined time period, the information processing apparatus 100 goes to step S118. In step S118, the information processing apparatus 100 checks to determine whether the F key (a reference virtual operation key) and/or the J key (another reference virtual operation key) is being touched.

Illustratively, the information processing apparatus 100 performs the check in step S118 based on whether the result of the detection by the touch screen (e.g., coordinate information on the touch screen) coincides with the information representing the locations of the reference virtual operation keys displayed on the touch screen. The way the check is made in step S118 is not limited to what was described above. Alternatively, the information processing apparatus 100 may first check to determine whether a reference virtual operation key is being touched by the user's index finger. If the user's index finger is found to be in contact with the reference virtual operation key, the information processing apparatus 100 may then determine that the F key and/or J key is being touched. The information processing apparatus 100 may illustratively be equipped with an electrostatic sensor on its touch screen so as to perform the above-described check based on the result of the detection by the electrostatic sensor and on geometric data about the user's hands (e.g., data indicative of the lengths of the fingers and the positional relations therebetween). Again, the way the check in step S118 is made is not limited to the preceding description.

If in step S118 the F key (a reference virtual operation key) and/or the J key (another reference virtual operation key) is not found to be touched, then the information processing apparatus 100 goes to step S122. In step S122, the information processing apparatus 100 determines that no key input operation has been performed by the user and thus disables key input. The information processing apparatus 100 then returns to step S100 and repeats the subsequent steps.

If in step S118 the F key (a reference virtual operation key) and/or the J key (another reference virtual operation key) is found to be touched, then the information processing apparatus 100 goes to step S120. In step S120, the information processing apparatus 100 performs the notification process, giving notification to the user illustratively by vibration (i.e., tactile notification) or by sound (auditory notification). These forms of notification are examples and not limitative of the present invention.

In step S122, the information processing apparatus 100 disables key input, and returns to step S100 and repeats the subsequent steps. In the flowchart of FIG. 5, step S120 is shown followed by step S122, but this is not limitative of the present invention. Alternatively, the start of step S120 may be synchronized with the execution of step S122.

By carrying out steps S118 through S122 based on the result of the determination in step S110, the information processing apparatus 100 can distinguish the user "touching" any virtual operation key from the user "pressing" any virtual operation key. Also, by performing steps S118 through S122 to find whether the user's fingertips are placed on the home position, the information processing apparatus 100 can give notification selectively to the user.

The information processing apparatus 100 can accomplish the above-described process (1) (key input operation determination process) and process (2) (notification process) as an approach to enhancing the user's convenience illustratively by performing the steps shown in FIG. 5. That is, the execution of the steps in FIG. 5 allows the information processing apparatus 100 to improve the user's ease of operation in handling the virtual input interface displayed on the display screen.

The processing carried out as an approach to boosting the user's convenience in conjunction with the embodiments of the present invention is not limited to what is shown in FIG. 5. Alternatively, the information processing apparatus 100 may perform step S100 in FIG. 5 while concurrently carrying out steps S102 through S122.

(Information Processing Apparatus Embodying the Present Invention)

What follows is an explanation of the information processing apparatus 100 which, as an embodiment of the present invention, is capable of implementing approaches to enhancing the user's convenience.

Figure 6:
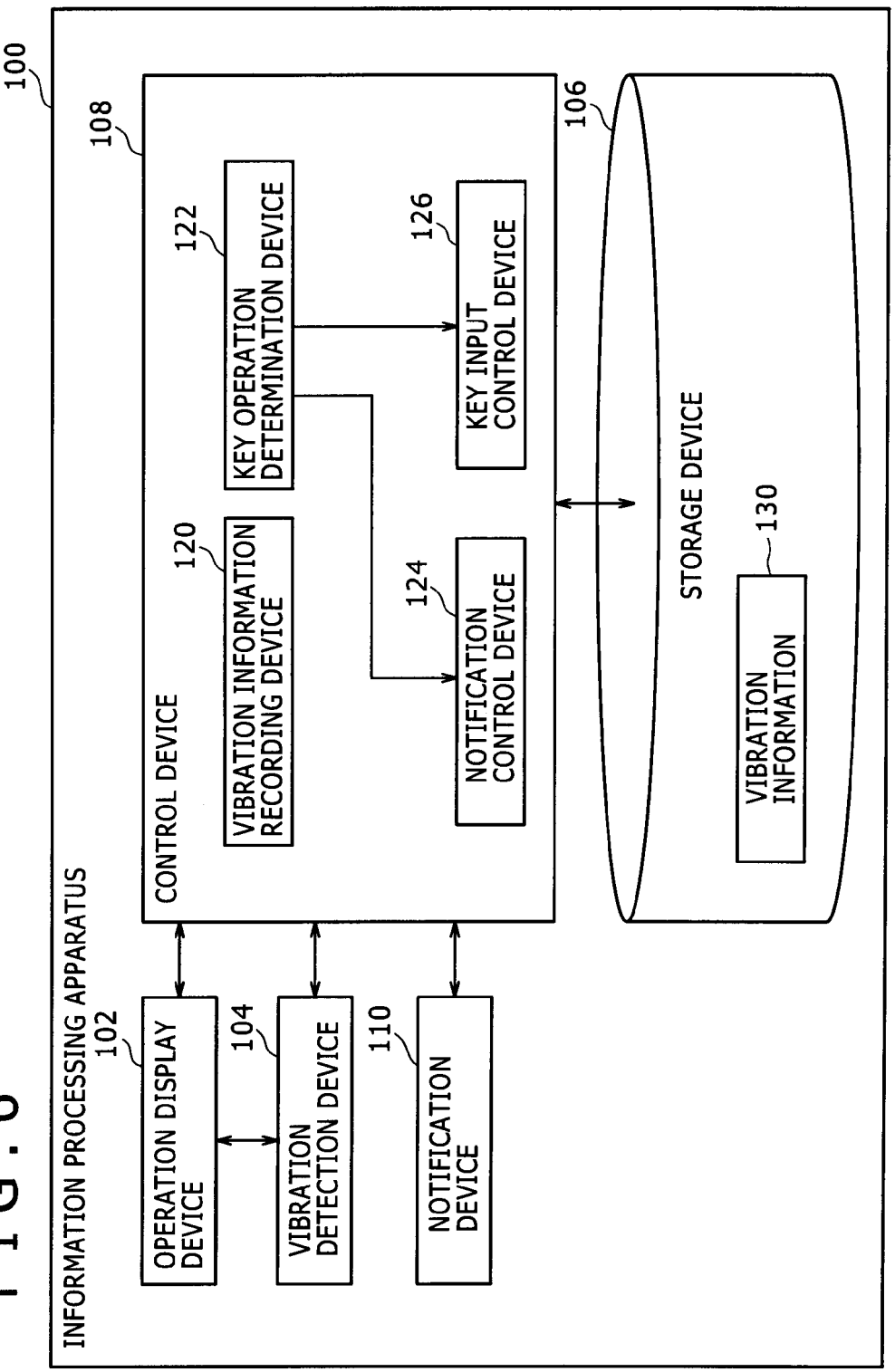
FIG. 6 is a block diagram explanatory of a typical structure of the information processing apparatus embodying the present invention.

FIG. 6 is a block diagram explanatory of a typical structure of the information processing apparatus 100 embodying the present invention. As illustrated, the information processing apparatus 100 includes an operation display device 102, a vibration detection device 104, a storage device 106, a control device 108, and a notification device 110.

The information processing apparatus 100 may further include a ROM (not shown), a RAM (random access memory; not shown), a communication device (not shown), and an operation device (not shown) that can be operated by the user. Illustratively, the information processing apparatus 100 utilizes a bus structure providing data transmission paths between the components of the apparatus 100.

The ROM (not shown) stores the programs to be used by the control device 108 as well as control data such as operation parameters for use thereby. The RAM (not shown) illustratively serves as a primary storage that accommodates the programs being executed by the control device 108. An example of the operation device (not shown) is an operation input device, to be discussed later. The communication device (not shown) serves to communicate with an external apparatus in wired or wireless fashion either directly or via networks. The networks may typically include wired networks such as a LAN (local area network) and a WAN (wide area network), wireless networks such as a wireless WAN (wireless wide area network or WWAN) operating via a base station and a wireless MAN (wireless metropolitan area network or WMAN), and the Internet utilizing communication protocols such as TCP/IP (Transmission Control Protocol/Internet Protocol). An example of the communication device (not shown) is a communication interface, to be discussed latter.

[Typical Hardware Structure of the Information Processing Apparatus 100]

Figure 7:
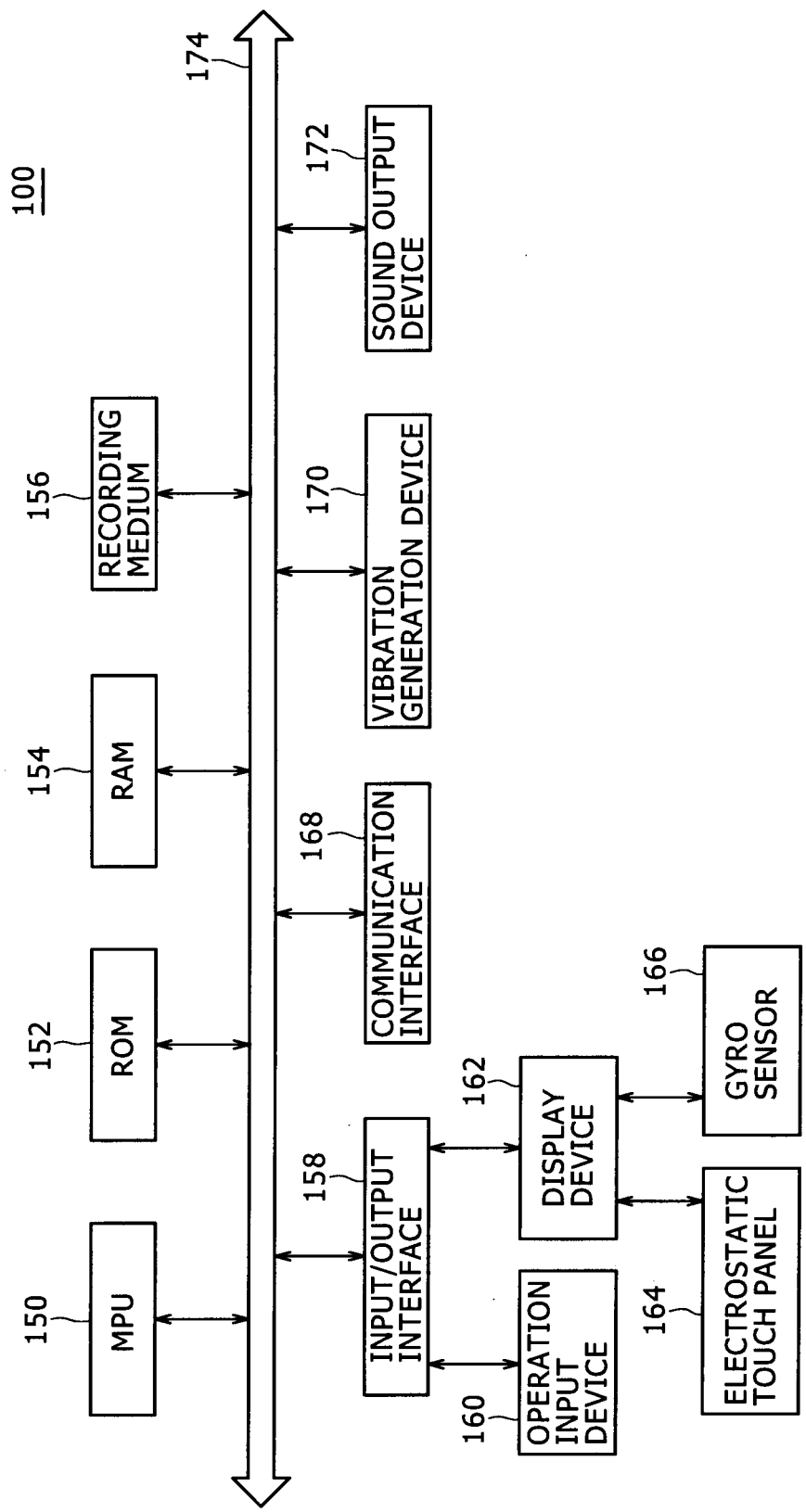
FIG. 7 is a block diagram explanatory of a typical hardware structure of the information processing apparatus embodying the present invention.

FIG. 7 is a block diagram explanatory of a typical hardware structure of the information processing apparatus 100 embodying the present invention. Referring to FIG. 7, the information processing apparatus 100 illustratively includes an MPU 150, a ROM 152, a RAM 154, a recording medium 156, an input/output interface 158, an operation input device 160, a display device 162, an electrostatic touch panel 164, a gyro sensor 166, a communication interface 168, a vibration generation device 170, and a sound output device 172. The information processing apparatus 100 also includes a bus 174 serving as data transmission paths connecting the component devices of the apparatus.

The MPU (micro processing unit) 150 is illustratively composed of an integrated circuit that integrates a plurality of circuits for implementing control functions. The MPU 150 typically serves as the control device 108 for controlling the information processing apparatus 100 as a whole. In the information processing apparatus 100, the MPU 150 may also play the roles of a vibration information recording device 120, a key operation determination device 122, a notification control device 124, and a key input control device 126, to be described later.

The ROM 152 stores the programs to be used by the MPU 150 as well as control data such as operation parameters for use thereby. The RAM illustratively serves as a primary storage that accommodates the programs being executed by the MPU 150.

The recording medium 156 functions as the storage device 106 that stores diverse data including vibration information (data) and applications. Examples of the recording medium 156 include, but are not limited to, magnetic recording media such as hard disks, and nonvolatile memories such as EEPROM (electrically erasable and programmable read only memory), flash memory, MRAM (magneto-resistive random access memory), FeRAM (ferro-electric random access memory), and PRAM (phase change random access memory).

The input/output interface 158 is connected illustratively with the operation input device 160 and display device 162. Examples of the input/output interface 158 include, but are not limited to, USB (Universal Serial Bus) terminals, DVI (Digital Visual Interface) terminals, HDMI (High-Definition Multimedia Interface) terminals, and diverse processing circuits. Obviously, the input/output interface 158 may also be connected with operation input devices (e.g., keyboard and mouse) and display devices (e.g., external display) which are external to the information processing apparatus 100.

The operation input device 160 functions as the operation device (not shown). Illustratively, the operation input device 160 is mounted on the information processing apparatus 100 and connected to the input/output interface 158 inside the apparatus 100. Examples of the operation input device 160 include, but are not limited to, buttons, arrow keys, rotary selectors such as jog dials, and combinations of these controls.

Along with the electrostatic touch panel 164, the display device 162 functions as the operation display device 102. Illustratively, the display device 162 is mounted on the information processing apparatus 100 and connected to the input/output interface 158 inside the apparatus 100. Examples of the display device 162 include, but are not limited to, LCDs (liquid crystal displays) and organic electroluminescence (EL) displays (also called organic light emitting diode displays).

The display device 162 carries thereon the electrostatic touch panel 164 capable of detecting the user's touching operations and the gyro sensor 166 capable of detecting vibrations. The display device 162, electrostatic touch panel 164, and gyro sensor 166 combine to make up the touch screen which in part embodies the present invention and which is capable of detecting both the user's operations and the vibrations caused thereby.

The communication interface 168 is means for communication possessed by the information processing apparatus 100 and functions as a communication device (not shown) for communicating with an external apparatus in wired or wireless fashion directly or via networks. Examples of the communication interface 168 include, but are not limited to, an antenna and an associated RF circuit (for wireless communication), an IEEE 802.15.1 port and an associated transmission/reception circuit (for wireless communication), an IEEE 802.11b port and an associated transmission/reception circuit (for wireless communication), and a LAN terminal and an associated transmission/reception circuit (for wired communication).

The vibration generation device 170 functions as the notification device 110. Illustratively, the vibration generation device 170 generates vibrations selectively based on control signals coming from the MPU 150. Examples of the vibration generation device 170 include, but are not limited to, a vibrating motor.

The sound output device 172 also functions as the notification device 110. Illustratively, the sound output device 172 generates sounds selectively based on control signals coming from the MPU 150. Examples of the sound output device 172 include, but are not limited to, the combination of a DSP (digital signal processor), an amplifier, and a speaker.

Structured illustratively as shown in FIG. 7, the information processing apparatus 100 embodying the present invention performs the above-described process (1) (key input operation determination process) and process (2) (notification process) so as to implement the approach to enhancing the user's convenience.

The hardware structure of the information processing apparatus 100 as one embodiment of the invention is not limited to what is shown in FIG. 7. Alternatively, the information processing apparatus 100 may have the electrostatic touch panel 164 replaced by a pressure-sensitive touch panel. As another alternative, the information processing apparatus 100 may have the gyro sensor 166 replaced by an acceleration sensor. As a further alternative, the information processing apparatus 100 may have slots to accommodate another display device such as an LCD, and an external recording medium such as a Memory Stick.

Referring again to FIG. 6, an explanation will be made below of the components making up the information processing apparatus 100. The operation display device 102 has a plurality of virtual operation keys arranged (i.e., assigned) in a predetermined key layout on its display screen. The display screen of the operation display device 102 may thus display the OSK such as one shown in FIG. 1. Also, the operation display device 102 detects the operations performed by the user on the display screen, such as touching operations and release operations. The result of the detection such as information indicating the coordinates pointing to a touched location on the display screen is sent from the operation display device 102 to the control device 108. The result of the detection by the operation display device 102 is not limited to the information denoting the coordinates pointing to the touched location on the display screen. Alternatively, the result of the detection may be any information indicative of the touched state and the touched location.

The vibration detection device 104 detects changes in vibration on the operation display device 102. The results of the detection such as those indicated by reference character B in FIGS. 2A through 2C are sent from the vibration detection device 104 to the control device 108. Although the information processing apparatus 100 utilizes the display device 162, electrostatic touch panel 164 and gyro sensor 166 to constitute the operation display device 102 and vibration detection device 104 in this particular structure, this is not limitative of the present invention.

The storage device 106 is means for storage possessed by the information processing apparatus 100. Examples of the storage device 106 include, but are not limited to, magnetic recording media such as hard disks and nonvolatile memories such as flash memories.

The storage device 106 stores diverse data including vibration information (data) and applications. The setup in FIG. 6 shows that vibration information 130 is arranged to be stored in the storage device 106. However, this arrangement is merely an example and not limitative of the present invention.

The control device 108 is constituted illustratively by an MPU or by an integrated circuit integrating diverse processing circuits, and plays the role of controlling the information processing apparatus 100 as a whole. The control device 108 contains the vibration information recording device 120, key operation determination device 122, notification control device 124, and key input control device 126, and plays the principal role in the execution of the above-described process (1) (key input operation determination process) and process (2) (notification process).

The vibration information recording device 120 records to the storage device 106 the result of the detection sent from the vibration detection device 104 as vibration information. The location to which the vibration information recording device 120 records the vibration information is not limited to the storage device 106. Alternatively, the vibration information recording device 120 may record the vibration information to an external recording medium (not shown) accommodated in a slot (not shown) of the apparatus 100. As another alternative, the vibration information recording device 120 may record the vibration information to an external device that may be accessed either directly or via networks.

The key operation determination device 122 determines whether a key input operation is performed on each of the virtual operation keys based on the result of the detection sent from the operation display device 102 and on the vibration information recorded in the storage device 106 (corresponding to the result of the detection sent from the vibration detection device 104). That is, the key operation determination device 122 serves to carry out the above-mentioned process (1) (key input operation determination process). Also, the key operation determination device 122 sends the result of the determination selectively to the notification control device 124 and/or key input control device 126 depending on the nature of the result of the determination.

More specifically, the key operation determination device 122 performs steps S102 through S114 and step S118 in the flowchart of FIG. 5. Obviously, what is performed by the key operation determination device 122 is not limited to the steps given in FIG. 5.

The notification control device 124 controls the notification device 110 to give notification selectively to the user on the basis of the result of the determination sent selectively from the key operation determination device 122. More specifically, if the result of the determination indicates that no key input operation is performed on any of the virtual operation keys and that the virtual operation key corresponding to the result of the detection by the operation display device 102 is a reference virtual operation key, then the notification control device 124 selectively generates a control signal for controlling the notification. The notification control device 124 proceeds to send the generated control signal to the notification device 110. Given the control signal, the notification device 110 gives notification selectively to the user. That is, the notification control device 124 serves to carry out the above-mentioned process (2) (notification process).

The key input control device 126 enables or disables key input through the virtual operation keys displayed on the operation display device 102 on the basis of the result of the determination sent selectively from the key operation determination device 122. More specifically, if the result of the determination sent from the key operation determination device 122 indicates that no key input operation is performed on any of the virtual operation keys, then the key input control device 126 selectively disables the key input through the virtual operation keys corresponding to the result of the detection by the operation display device 102. If the result of the determination sent from the key operation determination device 122 reveals anything else, then the key input control device 126 enables the key input selectively.

The control device 108 is constituted by the vibration information recording device 120, key operation determination device 122, notification control device 124, and key input control device 126. As such, the control device 108 plays the principal role in executing the above-described process (1) (key input operation determination process) and process (2) (notification process).

The notification device 110 gives notification to the user based on the control signal sent from the control device 108 (or from the notification control device 124, to be more exact). Illustratively, the notification device 110 gives notification to the user in the form of vibration (i.e., tactile notification) or sound (auditory notification). However, these forms of notification are merely examples and not limitative of the present invention. Depending on the form of notification in use, the information processing apparatus 100 may possess the vibration generation device 170 and/or the sound output device 172 as the notification device 110. Examples of the notification device 110 incorporated in the information processing apparatus 100 are not limited to the vibration generation device 170 and/or the sound output device 172.

When structured illustratively as shown in FIG. 6, the information processing apparatus 100 acts to implement the above-described process (1) (key input operation determination process) and process (2) (notification process). In so doing, the information processing apparatus 100 can improve the user's ease of operation in handling the virtual input interface displayed on the display screen.

As described above, the information processing apparatus 100 as one embodiment of the present invention performs the above-described process (1) (key input operation determination process) to distinguish between the user "touching" any virtual operation key and the user "pressing" any virtual operation key. Based on the result of the process (1), the information processing apparatus 100 selectively enables or disables key input through the virtual operation keys. Thus when the user merely touches the so-called home position of the touch screen with his or her fingertips, the information processing apparatus 100 does not recognize mistakenly that any key input operation has been performed. Also, the information processing apparatus 100 performs the above-described process (2) (notification process) based on the result of the process (1). When the information processing apparatus 100 gives notification selectively to the user by carrying out the process (2), the user can find out whether his or her fingertips are placed on the reference virtual operation keys. That is, the user utilizing the information processing apparatus 100 can sense whether his or her fingertips are placed on the reference virtual operation keys (i.e., on the home position) without visually ascertaining these keys as in the case of ordinary apparatuses adopting the old technique. Thus the information processing apparatus 100 allows the user to touch-type the virtual input interface on the display screen much more easily than ordinary information processing apparatuses. In this manner, the information processing apparatus 100 can boost the user's convenience in handling the virtual input interface displayed on the displays screen.

Whereas the information processing apparatus 100 has been discussed above along with its variations as preferred embodiments of the present invention, these embodiments are not limitative thereof. Alternatively, the present invention may be embodied in many other forms including computers such as PCs and notebook PCs, portable communication devices such as mobile phones and PHS (Personal Handyphone System), video/music players such as WALKMAN (registered trademark), portable game machines such as PlayStation Portable (registered trademark), and TV sets capable of receiving digital/analog broadcasts.

(Program for Embodying the Present Invention)

A program may be devised suitably to get a computer to function as the information processing apparatus embodying the present invention, whereby the user's convenience in handling the virtual input interface displayed on the display screen may be enhanced.

It is to be understood that while the invention has been described in conjunction with specific embodiments with reference to the accompanying drawings, it is evident that many alternatives, modifications and variations will become apparent to those skilled in the art in light of the foregoing description.

For example, in the information processing apparatus 100 of FIG. 6, the control device 108 is shown structured to include integrally the vibration information recording device 120, key operation determination device 122, notification control device 124, and key input control device 126. This structure, however, is not limitative of the information processing apparatus embodying the present invention. Alternatively, the information processing apparatus of the invention may be furnished with a vibration information recording device 120, a key operation determination device 122, a notification control device 124, and a key input control device 126, each device being established separately (e.g., implemented using a separate processing circuit).

Also, the foregoing description has shown that the program (i.e., computer program) for causing a computer to function as the information processing apparatus embodying the present invention is provided. As another embodiment of the present invention, there may also be provided a storage medium that stores such a program.

It is thus intended that the present invention embrace all such alternatives, modifications and variations as fall within the spirit and scope of the appended claims. That is, the scope of the invention should be determined by the appended claims and their legal equivalents, rather than by the examples given.

The present application contains subject matter related to that disclosed in Japanese Priority Patent Application JP 2009-091306 filed in the Japan Patent Office on Apr. 3, 2009, the entire content of which is hereby incorporated by reference.

What is claimed is:

1. An information processing apparatus comprising:
   an operation display device configured to display a plurality of virtual operation keys on a display screen in a predetermined key layout so as to detect operations performed by a user on said display screen;
   a vibration detection device configured to detect vibration changes of said operation display device;
   a key operation determination device configured to determine whether a key input operation is performed on each of said virtual operation keys based on results of the detection by said operation display device and on results of the detection by said vibration detection device; and a notification control device configured to give notification selectively to said user based on results of the determination by said key operation determination device which indicate that no key input operation is being performed on any of said virtual operation keys and that the virtual operation keys corresponding to the results of the detection by said operation display device constitute reference virtual operation keys defining the position of reference, wherein determining that a key input operation has been performed comprises determining that: (1) a first total amount of vibration changes detected by the vibration detection device within a first time period is lesser than a threshold value; (2) a key was released within the first time period; and (3) a second total amount of vibration changes within a second time period is greater than or equal to the threshold value, the second time period being longer than the first time period, and including a time period during which the released key was being touched.

2. The information processing apparatus according to claim 1, wherein, if no key input operation is determined to have been performed on the virtual operation keys corresponding to the results of the detection by said operation display device and if no other operation is detected to have been performed by said user since the detection of the operations performed by said user, then said key operation determination device determines whether the virtual operation keys corresponding to the results of the detection by said operation display device are said reference virtual operation keys.

3. The information processing apparatus according to claim 1, further comprising:

a key input control device configured to selectively enable or disable key input through the virtual operation keys corresponding to the results of the detection by said operation display device based on results of the determination by said key operation determination device.

4. The information processing apparatus according to claim 3, wherein said key input control device disables said key input based on those results of the determination by said key operation determination device which indicate that no key input operation is being performed on any one of said virtual operation keys.

5. The information processing apparatus according to claim 1, further comprising: a notification device configured to give notification selectively to said user under control of said notification control device.

6. A notification method comprising the steps of:

determining whether a key input operation is performed on each of a plurality of virtual operation keys displayed on a display screen in a predetermined key layout, based on results of an operation display device detecting operations performed by a user on said display screen, and on results of a vibration detection device detecting vibration changes of said operation display device; and giving notification selectively to said user based on results of the determination indicating that no key input operation is being performed on any of said virtual operation keys and that the virtual operation keys corresponding to the results of the detection by said operation display device constitute reference virtual operation keys defining the position of reference, wherein determining that a key input operation has been performed comprises determining that: (1) a first total amount of vibration changes detected by the vibration detection device within a first time period is lesser than a threshold value; (2) a key was released within the first time period; and (3) a second total amount of vibration changes within a second time period is greater than or equal to the threshold value, the second time period being longer than the first time period, and including a time period during which the released key was being touched.

7. A non-transitory computer-readable medium comprising program code operable, when executed by a computer, to cause the computer to execute a process comprising the steps of:

determining whether a key input operation is performed on each of a plurality of virtual operation keys displayed on a display screen in a predetermined key layout, based on results of an operation display device detecting operations performed by a user on said display screen, and on results of a vibration detection device detecting vibration changes of said operation display device; and giving notification selectively to said user based on results of the determination indicating that no key input operation is being performed on any of said virtual operation keys and that the virtual operation keys corresponding to the results of the detection by said operation display device constitute reference virtual operation keys defining the position of reference, wherein determining that a key input operation has been performed comprises determining that: (1) a first total amount of vibration changes detected by the vibration detection device within a first time period is lesser than a threshold value; (2) a key was released within the first time period; and (3) a second total amount of vibration changes within a second time period is greater than or equal to the threshold value, the second time period being longer than the first time period and including the time period during which the key that was released was being touched.

8. An information processing apparatus comprising:

operation display means for displaying a plurality of virtual operation keys on a display screen in a predetermined key layout so as to detect operations performed by a user on said display screen;

vibration detection means for detecting vibration changes of said operation display means;

key operation determination means for determining whether a key input operation is performed on each of said virtual operation keys based on results of the detection by said operation display means and on results of the detection by said vibration detection means; and notification control means for giving notification selectively to said user based on results of the determination by said key operation determination means which indicate that no key input operation is being performed on any of said virtual operation keys and that the virtual operation keys corresponding to the results of the detection by said operation display means constitute reference virtual operation keys defining the position of reference, wherein determining that a key input operation has been performed comprises determining that: (1) a first total amount of vibration changes detected by the vibration detection means within a first time period is lesser than a threshold value; (2) a key was released within the first time period; and (3) a second total amount of vibration changes within a second time period is greater than or equal to the threshold value, the second time period being longer than the first time period, and including a time period during which the released key was being touched.

\* \* \* \* \*